(12) United States Patent
Simrell

(10) Patent No.: US 6,682,104 B2
(45) Date of Patent: Jan. 27, 2004

(54) INTERFERENCE COUPLING FOR A HOSE

(75) Inventor: John William Simrell, P.O. Box 177, Union City, TN (US) 38281

(73) Assignee: John William Simrell, Union City, TN (US)

(*) Notice: Subject to any disclaimer, the term of this patent is extended or adjusted under 35 U.S.C. 154(b) by 29 days.

(21) Appl. No.: 09/683,686

(22) Filed: Feb. 4, 2002

(65) Prior Publication Data

US 2003/0146618 A1 Aug. 7, 2003

(51) Int. Cl.$^7$ ................................................ F16L 33/00
(52) U.S. Cl. .................... 285/256; 285/259; 285/242; 285/68; 285/222
(58) Field of Search ................................. 285/242, 259, 285/256, 114, 115; 68/222, 5 R

(56) References Cited

U.S. PATENT DOCUMENTS

| | | | | |
|---|---|---|---|---|
| 2,371,971 A | * | 3/1945 | Main et al. ................. | 285/359 |
| 2,462,323 A | * | 2/1949 | Hurst ......................... | 285/250 |
| 4,111,469 A | | 9/1978 | Kavick | |
| 4,150,466 A | | 4/1979 | Horvath | |
| 4,426,857 A | | 1/1984 | Epstein | |
| 4,453,746 A | | 6/1984 | Keenan | |
| 4,486,036 A | * | 12/1984 | Storke et al. ............... | 285/253 |
| 4,557,399 A | | 12/1985 | Redick, Jr. | |
| 4,846,505 A | * | 7/1989 | Muller et al. ............... | 285/3 |
| 4,893,848 A | | 1/1990 | Melcher | |
| 4,958,861 A | | 9/1990 | Hamilton | |
| 4,991,876 A | | 2/1991 | Mulvey | |
| 5,137,309 A | | 8/1992 | Beagle | |
| 5,303,962 A | | 4/1994 | Orcutt et al. | |
| 5,413,147 A | | 5/1995 | Moreiras et al. | |
| 5,601,317 A | | 2/1997 | Crouse et al. | |
| 5,607,191 A | | 3/1997 | Wilson | |
| 5,609,047 A | | 3/1997 | Hellman, Jr. et al. | |
| 5,622,393 A | | 4/1997 | Elbich et al. | |
| 5,727,580 A | | 3/1998 | Patterson | |
| 5,911,448 A | | 6/1999 | Feher | |
| 5,947,386 A | | 9/1999 | Dick et al. | |
| 6,062,494 A | | 5/2000 | Mills | |
| 6,106,027 A | | 8/2000 | Mulvey et al. | |
| 6,186,559 B1 | | 2/2001 | Fisher et al. | |
| 6,193,282 B1 | | 2/2001 | Assenheimer | |
| 6,206,980 B1 | | 3/2001 | Robinson | |
| 6,270,126 B1 | | 8/2001 | Juedes | |

* cited by examiner

Primary Examiner—Lynne H. Browne
Assistant Examiner—Giovanna M Collins
(74) Attorney, Agent, or Firm—Buchanan Ingersoll

(57) ABSTRACT

Disclosed is an improved handle for a clothing steamer which solves the problem of steam delivery hose working free of a barbed fitting. The handle is fitted with a plurality of protrusions that impinge the outer diameter of the hose, thereby securing it in place through friction with the protrusions and also by forcing the inner diameter of the hose against the barbs of the barbed interference fitting.

8 Claims, 6 Drawing Sheets

INTERFERENCE COUPLING FOR A HOSE

FIELD OF THE INVENTION

This invention is related to the coupling of hoses to metal or hard plastic fittings for a variety of purposes and for the carrying of a variety of substances, such as air, water, steam, hydraulic fluid, etc.

BACKGROUND OF THE INVENTION

Many methods are well known in the art for the coupling of a flexible rubber or plastic hose to a metal or hard plastic fitting. One typical method involves the use of a barbed, interference-type fitting, wherein the metal or hard plastic fitting is formed, at the end to which the hose is to be attached, with a plurality of annular barbs which taper toward the hose end of the fitting. In such a fitting, the diameter of the barbed end of the fitting is typically of a slightly larger outer diameter than the inner diameter of the hose, such that the hose is deformed outwardly as the fitting is inserted into the open end of the hose, thereby creating the interference fit. Such fittings are well known in the prior art and are disclosed, in various configurations, in U.S. Pat. Nos. 4,453,746 (Keenan), 4,958,861 (Hamilton), 5,947,386 (Dick, et al.) and 6,270,126 B1 (Juedes) and many others.

In the Applicant's device, a portable clothing steamer of the type shown in FIG. 1, the interference fit is used to couple the handpiece of the steamer to the hose which delivers the steam from the steam-generating unit. The handpiece is composed of a hard plastic, while the hose is composed of flexible rubber. The fitting is covered by a hard plastic molding shaped to fit the hand of a typical user, to ease the use of the handpiece. It has been found that, after period of time, the interference fitting between the hose and the tube of the handpiece becomes loose, causing the handpiece to slip off of the end of the hose. This is most likely due the stretching of the rubber hose at the interference fitting due to the movement of the handpiece as it is used by the user, or by the rubber hose losing elasticity due to the movement of high-temperature steam therethrough.

This problem can be solved through the use of a clamp which fits around the outer diameter of the hose and which is tightened, thereby clamping the hose to the plurality of annular barbs present on the piece to which the hose is coupled. Such a solution is shown in FIG. 5 of Keenan, as reference number 80. One drawback to the use of the clamp is the added cost during the manufacturing process associated with adding and tightening the clamp. The cost of adding the clamp not only includes that actual cost of the clamp, but the cost of the added time in fitting and tightening the clamp, and the cost of any tools or machinery needed to install the clamp. It would therefore be desirable to find another method of preventing the hose from slipping off of the end of the interference fit.

SUMMARY OF THE INVENTION

The solution to the problem presented herein is the addition of a plurality of protrusions present on the inner surface of the covering of the steamer handpiece. These protrusions extend in from the inner surface of the covering of the handpiece and impinge on the outer surface of the hose at the point where the hose overlays the annular barbs on the coupling. The protrusions serve to hold the hose in place by dimpling the outer surface of the hose and by pushing the hose tighter against the annular barbs of the coupling. Because the covering of the handpiece is already being installed, this solution adds no additional cost to the manufacturing process. It has been found that, for this application, the optimal configuration is six barbs arranged in two groups of thee such that they contact the outer surface of the hose on opposite sides thereof. Preferably, the barbs are staggered and contact the hose at a spacing equivalent to the spacing of the barbs of the interference fitting, such that the protrusions serve to push the inner surface of the hose into contact with the shoulders of the individual barbs of the interference fitting. Other configurations may be more optimal for other applications, and the placement and number of protrusions may be varied within the scope of the invention.

DETAILED DESCRIPTION OF THE INVENTION

Figure 1:
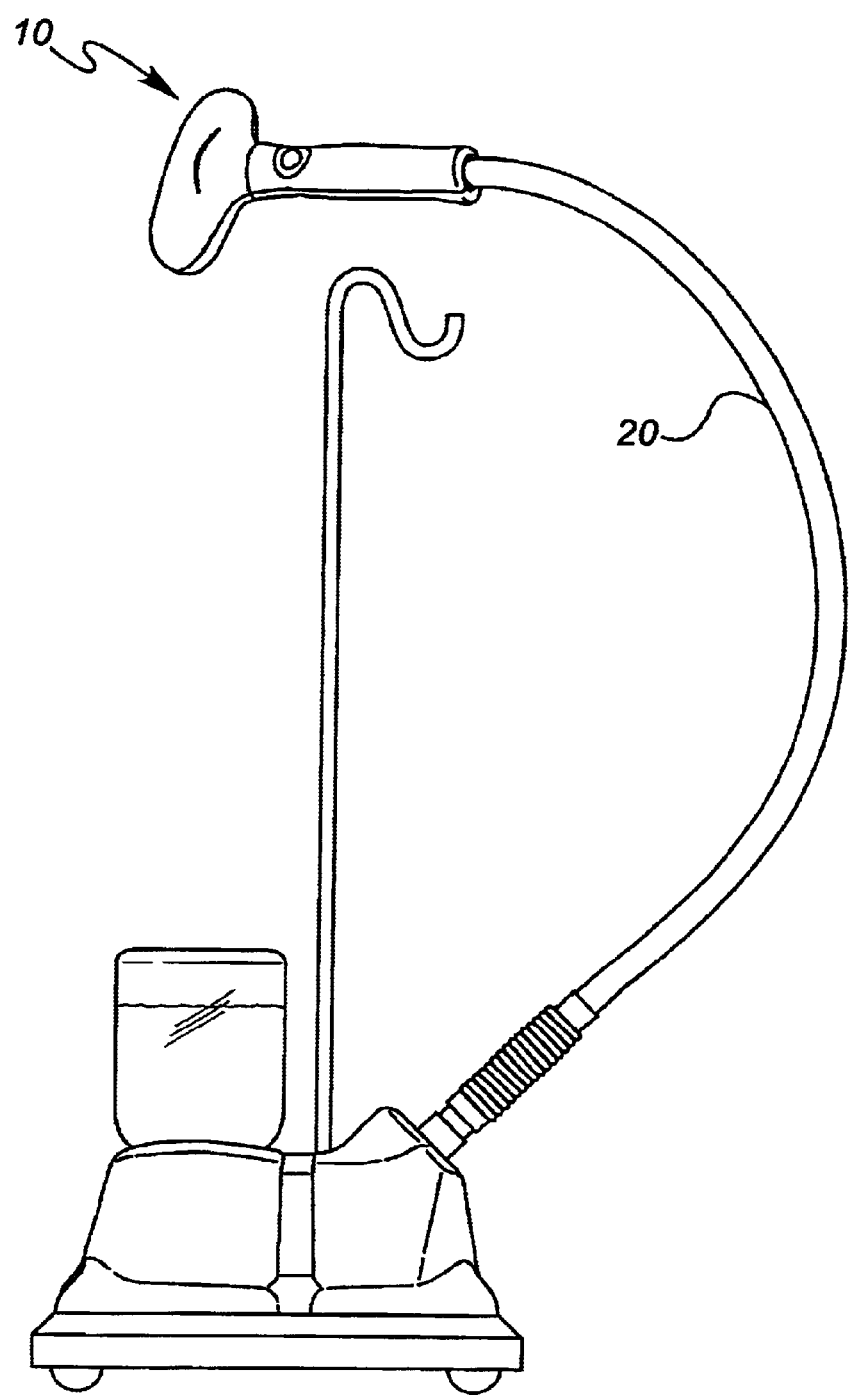
FIG. 1 shows a portable clothing steamer of the type for which the disclosed invention can be used.
Figure 2A:
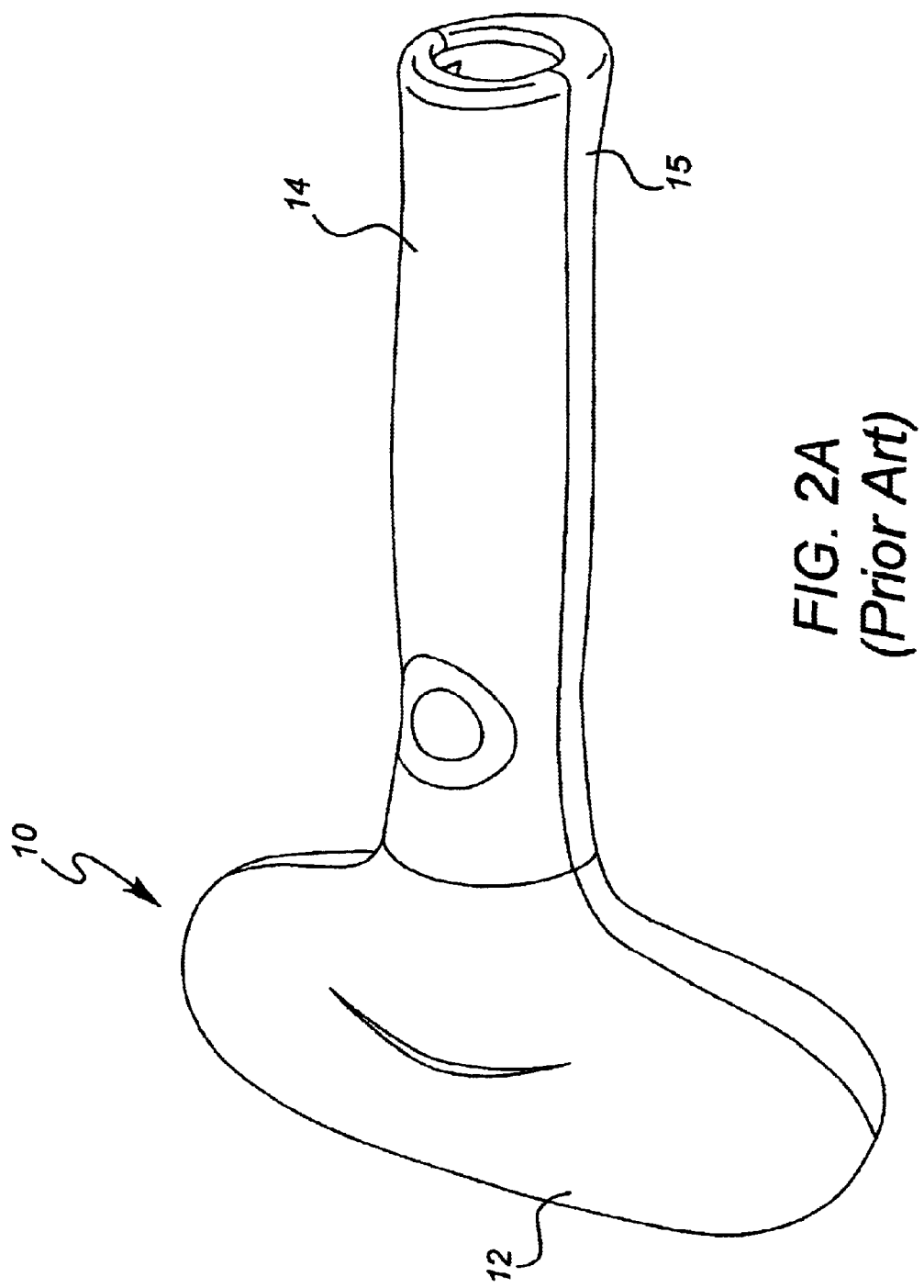
FIGS. 2A and 2B show a prior art hand piece of the type used on the steamer shown in FIG. 1.
Figure 2B:
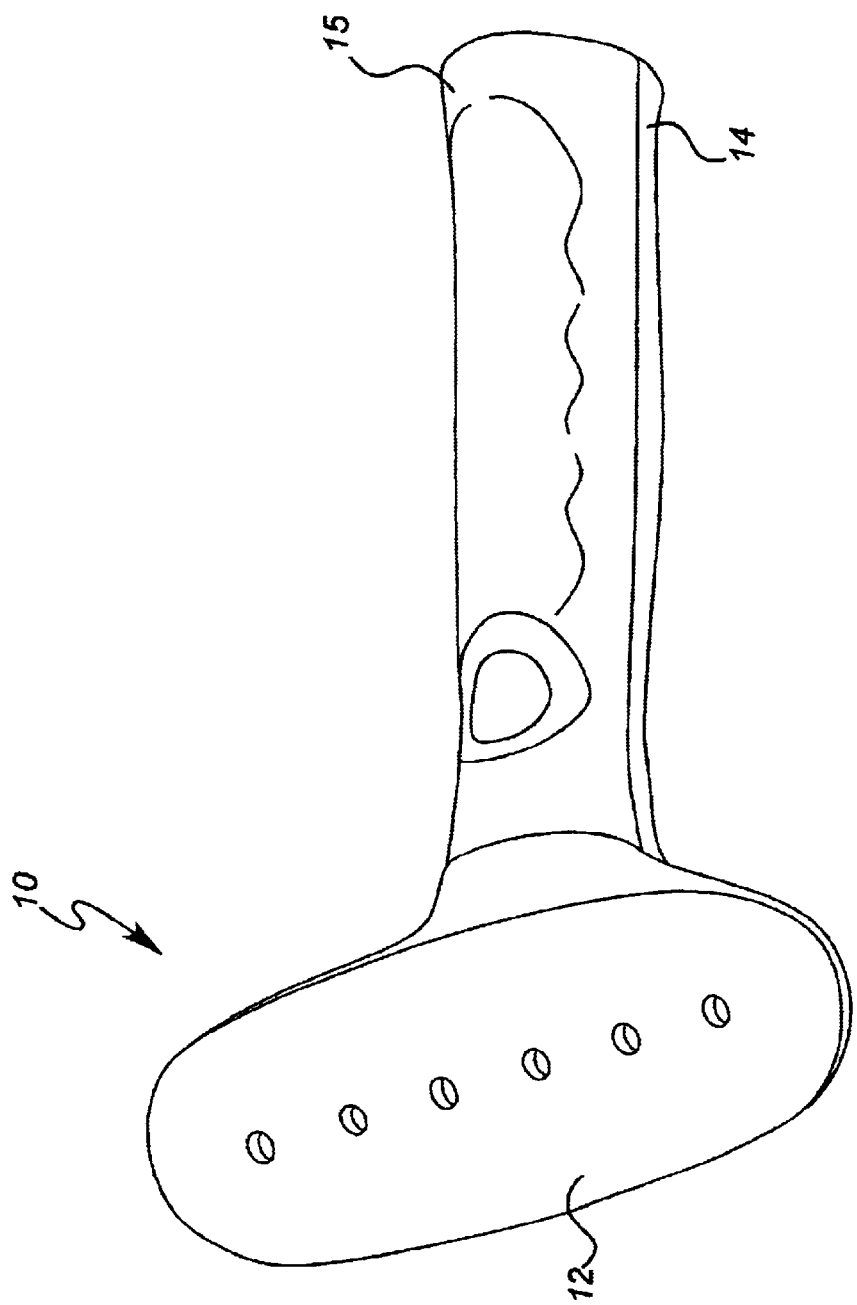
Figure 3:
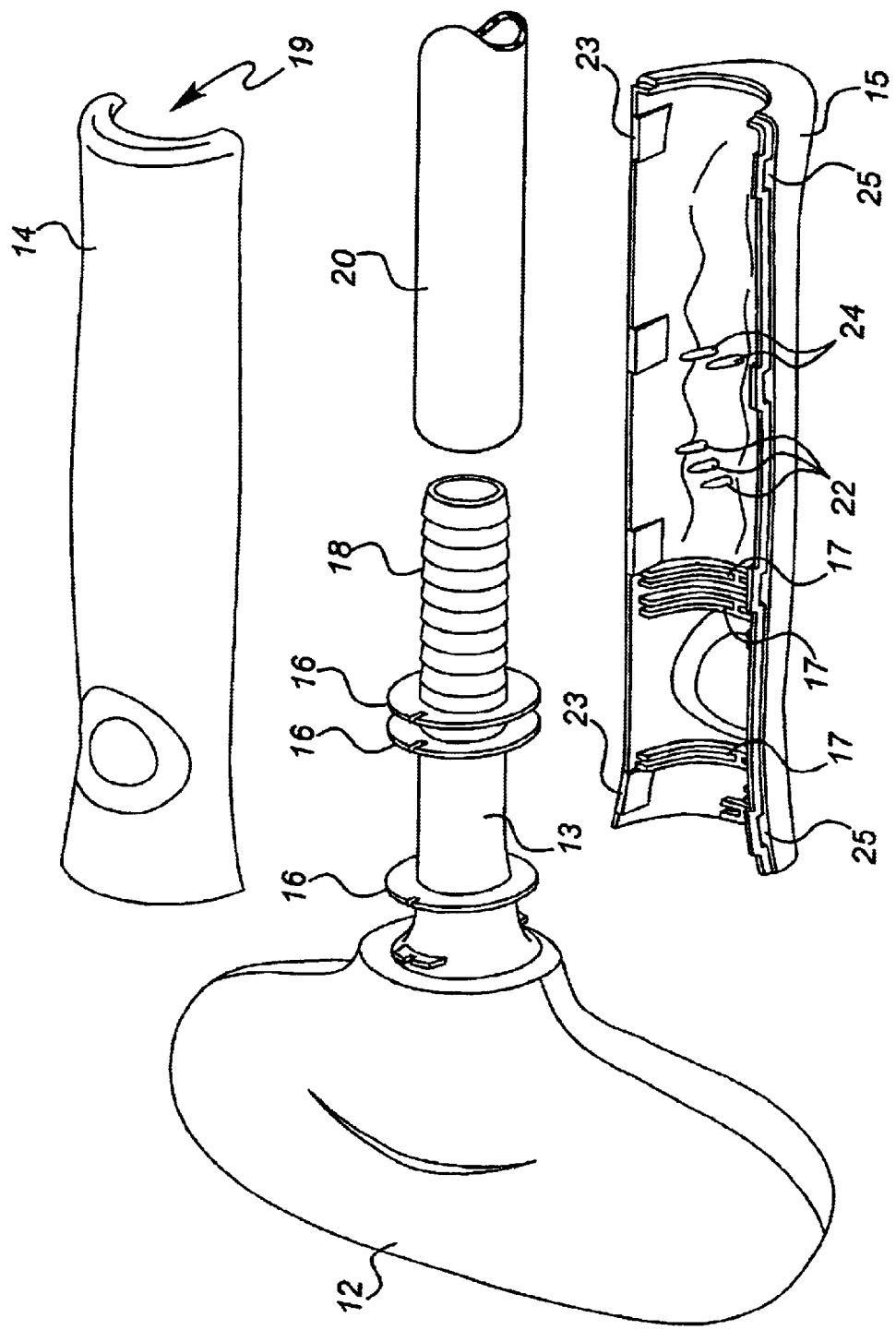
FIG. 3 shows an exploded view of the handpiece of the present invention.

Referring to FIG. 3, it can be seen that steamer handpiece 10 includes steam head 12, steam delivery tube 13, barbed fitting 18 and stabilizing rings 16. Hose 20 is secured to the end of steam delivery tube 13 by sliding hose 20 over barbed fitting 18. Handpiece 10 is then assembled by joining handle pieces 14 and 15 around steam delivery tube 13 and hose 20, whereupon rings 16 fit into slots 17 to provide spacing and stabilization. Hose 20 will extend from opening 19 formed when handle pieces 14 and 15 are joined. The invention itself consists of protrusions 22 shown in FIGS. 3 and 4. Protrusions 22 extend from both parts of the handle pieces 14 and 15 and thereby impinge on hose 20 on opposite ends of the outer diameter thereof. This causes the formation of dimples in hose 20, making it difficult to slide hose 20 off of barbed fitting 18 and also causes the inner diameter of hose 20 to come in contact with the shoulders of the individual barbs of barbed fitting 18, thereby further making it difficult to remove hose 20 from barbed fitting 18.

Figure 4:
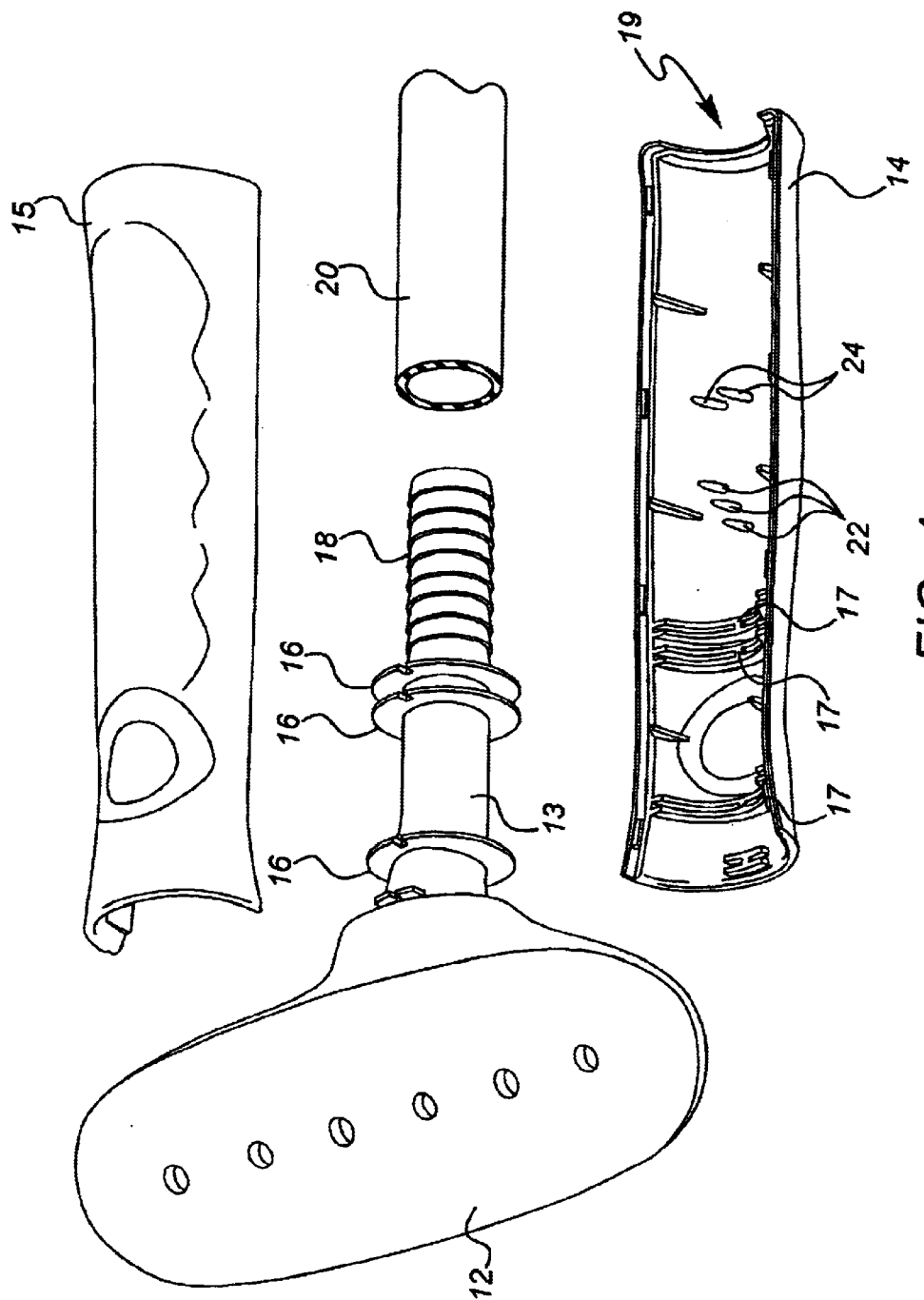
FIG. 4 shows an inverted exploded view of the handpiece of the present invention.
Figure 5:
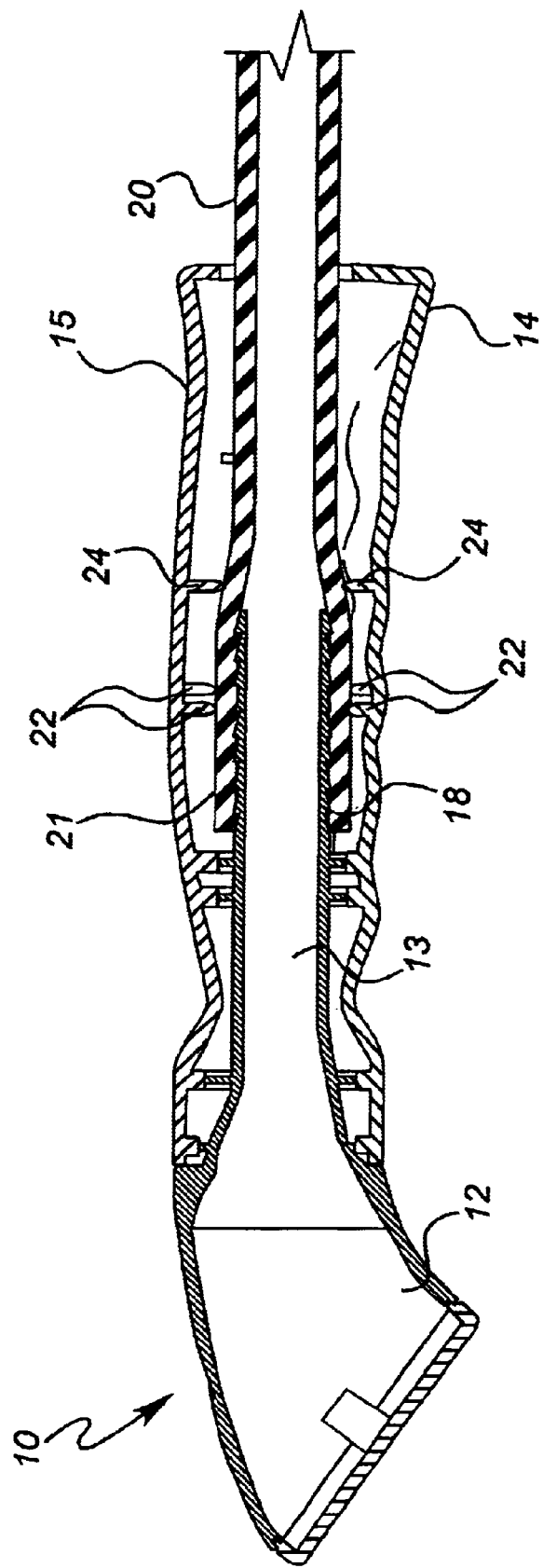
FIG. 5 shows a cross-sectional view of the invention.

FIG. 4 is shown to illustrate the inner diameter of handle piece 15, which is a mirror image of handle piece 14 shown in FIG. 3. A cross-sectional view is shown in FIG. 5. It can be seen that hose 20 becomes stretched or widened in area 21 to fit over a barbed fitting 18, thereby forming the interference fit. Protrusions 22 extend just far enough from handle pieces 14 and 15 such that the surface of hose 20 is dimpled. As shown, protrusions 22 are preferably spaced with the approximate spacing of the individual barbs in barbed fitting 18, such that the inner diameter of hose 22 will be pressed into the shoulders of the individual barbs. Protrusions 24 add further stabilization to the outer end of the hose, and are positioned to contact the hose at a point away from stretched or widened area 21 of hose 20. As such, protrusions 24 must be slightly longer than protrusions 22.

Handle pieces 14 and 15 comprise the handle for the handpiece, having indentations on the outside thereof for the user's fingers, and a separate indentation for the user's thumb, to allow precise control of the steam head. Handle pieces 14 and 15 must be secured around handle 10 with some amount of force, because protrusions 22 are dimpling hose 20 as handle pieces 14 and 15 are put into place. In the preferred embodiment, handle pieces 14 and 15 are held into place with a snap fitting comprising snaps 23 and recesses 25 which receive snaps 23, however, any method known in the art of securing handle pieces 14 and 15 may be used.

Although a particular application is shown, the invention disclosed herein can be used for any fitting where a hose is being mated with a barbed interference fitting by simply providing a cover over the portion where the hose joins the fitting having the protrusions on the inner surface thereof. Preferably, protrusions 22 are of the same material as and are formed integrally with the outer covering, in this case, handle pieces 14 and 15. It is not necessary that the application be for a handpiece for any particular instrument, but may be for any application requiring the joining of a hose to a barb fitting where a covering can be applied thereover.

Also, the invention is not meant to be limited to the configuration of protrusions disclosed herein. Specifically, it is not necessary to have the same number of protrusions nor is it necessary to have the protrusions spaced with spacing equivalent to that of the individual barbs in barbed fitting 18 to remain within the spirit of the invention. Further, it is not necessary that protrusions 22 be arranged in two sets spaced on opposite sides of barbed fitting 18; for example, protrusions 22 could be arranged in four sets which are offset 90 degrees around the outer diameter of hose 20. The addition of protrusions 24 is optional and are added for this particular configuration to add stability to hose 20.

Therefore, the intended scope of the invention is covered by the claims which follow, and is not meant to be limited by exemplary configurations used herein as illustrations of the invention.

What is claimed is:

1. A handpiece for a portable clothing steamer comprising:
   a steam head portion defining one or more openings at one end thereof;
   a barbed hose fitting integral with said steam head portion;
   a rubber hose fitted over said barbed hose fitting;
   a first handle piece defining one or more protrusions on the inner surface thereof; and
   a second handle piece defining one or more protrusions on the inner surface thereof;
   wherein said protrusions defined on the inner surfaces of said first and said second handle pieces comprise:
      a first group of protrusions disposed such that they contact a portion of said hose having said barbed fitting disposed therein; and
      a second group of protrusions disposed such that they contact a portion of said hose not having said barbed fitting disposed therein;
   wherein said second group of protrusions is longer than said first group of protrusions; and further
   wherein said one or more protrusions defined on the inner surface of said first and said second handle pieces force the inner surface of said hose into frictional contact with the shoulders of individual barbs in said barbed hose fitting.

2. The handpiece of claim 1 wherein said one or more protrusions on said first and second handle pieces extend far enough from handle pieces to dimple the surface of said hose.

3. The handpiece of claim 2 wherein said one or more protrusions comprise a plurality of protrusions arranged in multiple sets of one or more protrusions, said multiple sets of one or more protrusions being evenly spaced around the outer surface of said hose.

4. The handpiece of claim 1 wherein said first handle piece and said second handle piece engage each other with a snap fitting.

5. The handpiece of claim 4 wherein said first and said second handle pieces engage said steam head portion when fitted together with said snap fitting.

6. The handpiece of claim 5 wherein said steam head portion defines one or more annular rings around the outer surface of said barbed hose fitting and further wherein said first and said second handle pieces define one or more annular slots around the inner surfaces thereof to engage said one or more annular rings defined on said steam head portion.

7. The handpiece of claim 1 wherein at least one of said first and said second handle pieces is contoured on the outer surface thereof to fit the shape of a human hand.

8. The handpiece of claim 7 wherein said first handle piece defines indentations for a plurality of fingers and further wherein said second handle piece defines an indentation for a thumb.

* * * * *